UNITED STATES PATENT OFFICE.

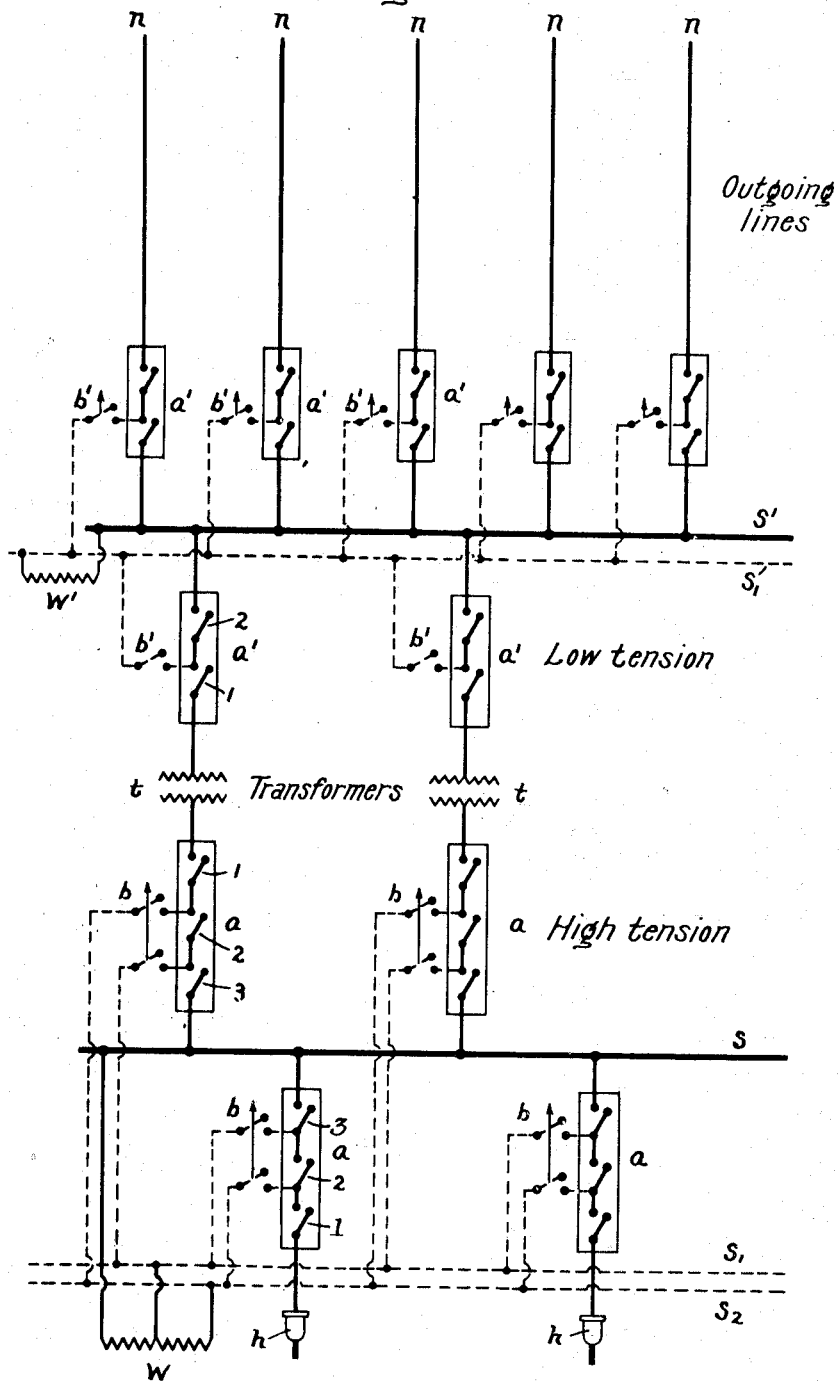

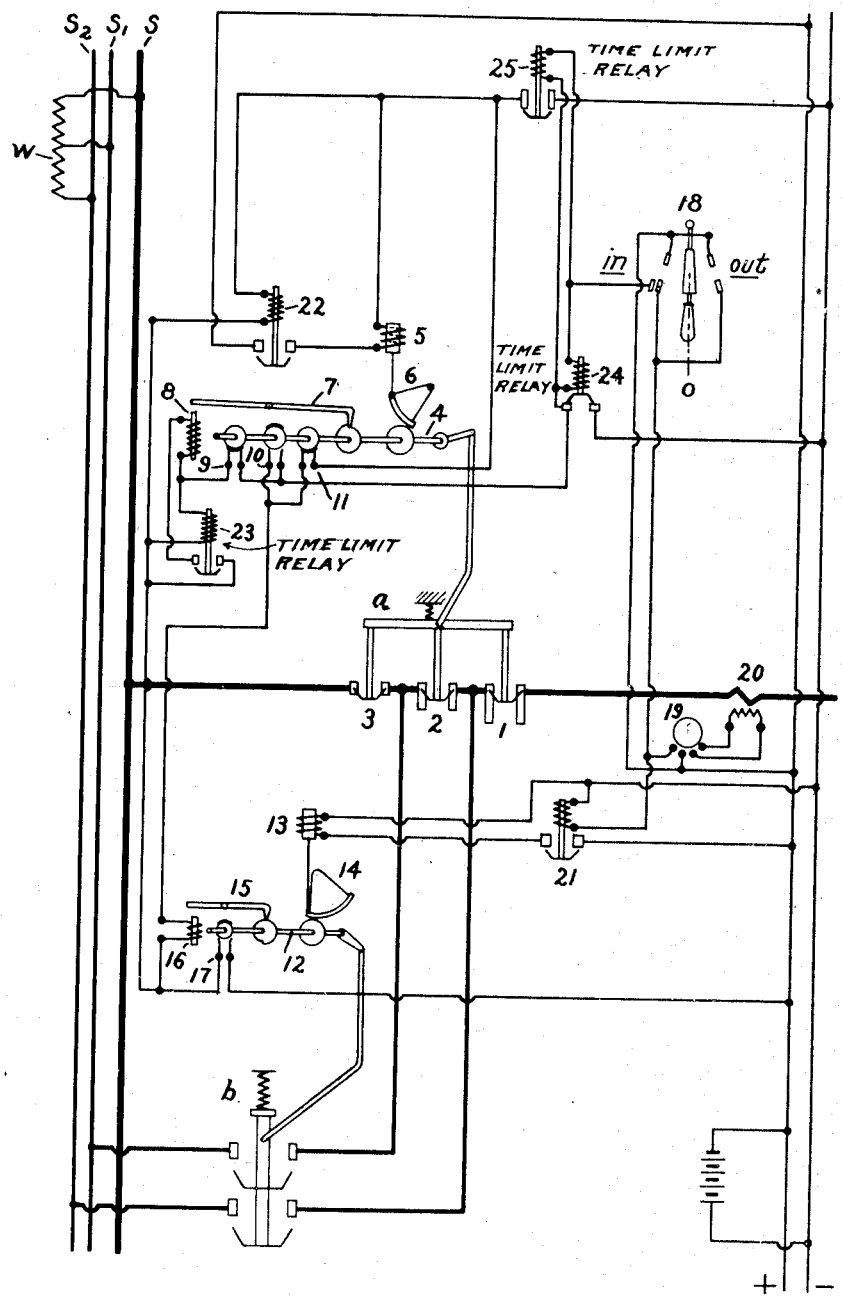

ERICH PHILIPPI, OF BERLIN, GERMANY, ASSIGNOR TO GENERAL ELECTRIC COMPANY, A CORPORATION OF NEW YORK.

ELECTRIC SWITCHING DEVICE.

1,281,826.  Specification of Letters Patent.  Patented Oct. 15, 1918.

Application filed February 26, 1914. Serial No. 821,331.

*To all whom it may concern:*

Be it known that I, ERICH PHILIPPI, a subject of the King of Prussia, residing at Berlin, Germany, have invented certain new and useful Improvements in Electric Switching Devices, of which the following is a specification.

My invention relates to electric switching devices and more particularly to switching devices for a number of conductors, transformers or other electrical apparatus, which are to be connected in circuit or disconnected from circuit through a protecting resistance.

In connecting and disconnecting circuit conductors, machines, or other electrical apparatus, it is customary, where large amounts of energy are to be handled, to use inductionless or inductive protecting resistances in order to prevent the occurrence of excessive voltages and also to avoid excessive current which otherwise might occur in consequence of the switching operations. Graduated switches have been used in these cases to connect the protecting resistance in circuit in one or more steps, when the line is interrupted, and thus weaken the current before it is entirely interrupted at the last switching step. To form the different switch steps, a number of individual switches or a single multi-step switching apparatus may be employed. In making circuit connection, the reverse of this process is followed and the protecting resistance is first connected in the circuit and then short-circuited as a whole or in steps. For switches which interrupt short-circuits of central stations with large capacity, the protecting resistances are extraordinarily costly and, further, they require a great deal of space and make it difficult to satisfactorily place the switching apparatus.

The object of my invention is to provide a switching device which is, in details to be more fully described, an improvement in devices of this general character. According to my invention, the switches for the individual conductor or apparatus are operatively connected together in such a manner that they must be actuated in the correct sequence not only in connecting the conductor or apparatus into circuit but also in cutting it out of circuit. By my invention, therefore, not only an incorrect working is prevented in cutting in and out, but also the further important advantage is secured that the common protecting resistance is made available also for the automatic cutting out of the apparatus in case of excessive current or of short-circuit.

The novel features which I believe to be characteristic of my invention will be definitely indicated in the claims appended hereto; the features of construction and mode of operation will be understood by reference to the following description taken in connection with the accompanying drawings in which Figure 1 shows diagrammatically the arrangement of the switches and protecting resistances, for example, for a transformer station with two parallel connected transformers, and Fig. 2 shows diagrammatically one example of construction for the operative connection of a main switch with its auxiliary switch for insuring the correct switching sequence.

In Fig. 1 only the connections for one pole or for one phase of the two parallel connected transformers $t$ are shown. At $s$ is indicated one conductor of the high voltage bus-bars, to which is connected the proper phase of the incoming high voltage lines $h$ and also the high voltage windings of the transformers $t$ each through a switch $a$. At $s'$ is indicated one conductor of the low voltage bus-bars to which is connected, through switches $a'$, the low voltage windings of the transformers and also the conductors $n$ of the outgoing low voltage lines. I provide a common protecting resistance $w$ for the high voltage switches and another common protective resistance $w'$ for the low voltage switches, the resistance $w$ being constructed in two steps, and the resistance $w'$ with a single step. The protecting resistances are continuously connected at one end to their corresponding bus bars. The other end of resistance $w$ and the middle tap thereof are connected to the auxiliary bus-bars, $s_1$ and $s_2$ on the high voltage side while the other end of resistance $w'$ is connected to the auxiliary bus bar $s_1'$ on the low voltage side. Each high voltage switch $a$ possesses, according to the two-stepped character of the high voltage resistance $w$, three switching steps and three switching positions or three mutually connected switches 1, 2, 3, which, when the corresponding conductor or transformer winding is put in circuit, are closed in the sequence stated, and in cutting out, are opened in the reverse sequence. For each main switch $a$, there is also provided an auxiliary $b$, by means of which, the auxiliary bus-bars $s_1$ and $s_2$ and therefore the protecting resistance $w$ is connected with the main switch, and in particular with the points lying between the switch positions. In a corresponding manner, for each main switch $a'$ of the low voltage side, an auxiliary switch $b'$ is provided. According to the single stepped character of the protective resistance $w'$ on the low voltage side, the main and the auxiliary switch of the low voltage side are more simply built.

According to my invention each main switch is operatively connected mechanically or electrically with its auxiliary switch in such a manner that each main switch can be closed or opened only if previously the corresponding auxiliary switch has been closed, while, after the closure or opening of the main switch, the corresponding auxiliary switch is opened again. The individual switching processes during closing or opening are effected automatically in the correct sequence, as soon as the cutting in or out of the conductor, machine, or other apparatus in question has been undertaken. The correct sequence of operation is also provided for, upon an automatic interruption, due either to the occurrence of overload, or short circuits. For this automatic interruption only the ordinary devices are used. In my arrangement, the auxiliary switches $b$ and $b'$ respectively are always cut in or out without current, and they carry the current that is to be interrupted only during the very short period of circuit closure or interruption; they can therefore be constructed quite simply and cheaply. The same is true as regards the auxiliary bus-bars $s_1$, $s_2$, $s_1'$, which may also be inexpensively built, with a very small outlay for material. The reduction of the cost of installation for the protecting resistances by the utilization of a single resistance for all the conductors, machines, and other electrical apparatus, which are to be connected to the same bus-bar, is strikingly apparent. The common protecting resistance is to be measured for the same current as in the case of separate protecting resistances for each individual conductor, namely for the total short-circuiting of the central station. With a view to this measurement of the protecting resistance, it is permissible that a number of main switches be simultaneously cut in or simultaneously cut out, or partly cut in, or partly cut out. It is therefore not necessary to lock the main switches together but each conductor, with its main and auxiliary switch, remains perfectly independent.

According to the showing in Fig. 1, I provide one protecting resistance for all switching on the high tension side and one protecting resistance for all switching on the low tension side. Each main switch $a$ or $a'$ may be independently actuated but is operated always in a definite sequence and interlocked with its corresponding auxiliary switch $b$ and $b'$ respectively. The auxiliary switches serve to connect the protecting resistance in series with whichever main switch that is to be operated. Assume one of the main switches $a$, below the bus bar $s$, for instance, is to be closed, to connect an incoming feeder to the bus bar. Before the main switch can be closed, its auxiliary switch $b$ has to be closed in a manner to be described, to connect the common protecting resistance $w$ in series with the main switch. The main switch is constructed to close in the sequence 1, 2, 3, as will be later described. When portion 1 of the main switch is closed, the circuit is from the conductor $h$, through the portion 1 of the main switch, through auxiliary switch $b$, auxiliary bus bar $s_2$, all of the resistance $w$, to bus bar $s$. Then portion 2 of the main switch closes and the circuit is from conductor $h$, through portions 1 and 2 of the main switch, auxiliary switch $b$, to auxiliary bus bar $s_1$, to the middle tap of resistance $w$, thence to bus bar $s$. Finally the portion 3 is closed and the circuit is now directly from the conductor $h$ to bus bar $s$. It is, therefore, apparent that closing the main switch in steps or portions, first cuts in resistance then short circuits half the resistance and finally short circuits all the resistance. When the main switch is closed its auxiliary switch $b$ automatically opens. It is also apparent from Fig. 1 that this same resistance $w$ can be connected with either of the main switches $a$ when they are connected in circuit. The reverse order takes place when any switch is disconnected from circuit. The auxiliary switch $b$ is first closed and then the main switch $a$ opened in sequence 3, 2, 1 including half of the resistance then all the resistance in series and finally the main switch completely opens and then its auxiliary switch opens. The same method occurs in connecting and disconnecting any main switch $a'$ with the exception that the resistance $w'$ is all cut in or cut out.

Fig. 2 shows in detail my arrangement for interlocking one of the main switches $a$ with its auxiliary switch $b$ and insuring the correct switching sequence.

As best shown in this figure the main switch $a$ is, in well known manner, put in circuit by a switch shaft 4 against the force of a spring, and bridges over the switch positions 1, 2, 3, in sequence, when the electromagnet 5 is energized. The latter rotates the switch shaft 4, with the coöperation of a toothed segment 6, into the indicated position, in which the switch $a$ is put in circuit. In this position, the switch and switch shaft are locked by a locking bolt 7, against which rests the tooth of a locking wheel mounted upon the switch shaft. If the bolt is drawn by an unlocking magnet 8, then the switch $a$ is released and cut out of circuit by spring power, the switch shaft 4 rotating about 180°, similar to putting the switch in circuit, but in the opposite direction. Mounted also upon the switch shaft 4 are three contact wheels which bridge the contacts 9, 10, 11, the contacts 9 and 11, being bridged as indicated, when the switch shaft is in circuit closing position, and the contacts 10 being bridged when the switch shaft is in circuit interrupting position.

In like manner the switch shaft 12 of the auxiliary switch $b$ is moved from circuit opening position into circuit closing position by means of an electromagnet 13 through the coöperation of the toothed segment 14. The switch shaft 12 is locked in circuit-closing position by means of a bolt 15, but when the bolt is released by the releasing magnet 16, the shaft 12 returns to the indicated circuit interrupting position. In circuit-closing position, a contact wheel mounted on shaft 12 bridges the auxiliary contacts 17. The indicated position of the switches $a$ and $b$ is that which they have under normal conditions, when the corresponding conductor or machine is connected to the bus bars.

To start the switching operations, a hand or operating switch 18 is employed, which for this purpose is moved to the left into the position "In" or to the right into the position "Out", and after being released returns again into the indicated zero position. For the automatic interruption in case of overload or short circuit, the overload relay 19 is employed, the coil of which is connected to the two right-hand terminals, and is fed from a current transformer 20 situated in series with the main switch $a$. When an overload occurs, the relay contacts, which are connected with the two left-hand terminals, are bridged. Furthermore, two intermediate relays 21 and 22 are provided for the electromagnets 13 and 5 respectively of the auxiliary and main switches respectively, and an intermediate relay 23 for the releasing magnet 8 of the main switch which is so arranged that after its excitation, it first closes its contacts only after one to two seconds. Time limit relays 24 and 25 are also provided, the relay 24 being so constructed that it opens its contacts about half a second after its energization and closes them again 3 to 4 seconds after its deënergization. The electromagnets and relays receive current from two control lines, indicated by plus and minus signs, which are fed, for example, from a battery.

In the description of the method of operation of this device, we will start from the position of the different parts as represented in Fig. 2, corresponding to normal working condition. If the switch 18 is moved to the right into the position marked "Out", the intermediate relay 21 is excited, in that a circuit from the plus wire is formed through the right-hand contacts of the hand switch 18 and the coil of the relay 21, to the minus wire. The intermediate relay operates and thereby closes the circuit for the electromagnet 13 of the auxiliary switch $b$. The operation of the magnet 13 actuates the toothed segment 14 so that auxiliary switch $b$ is closed and is locked in circuit closing position by the bolt 15. By putting the auxiliary switch $b$ in circuit, the common protecting resistance is connected with the main switch $a$, in series therewith as the switch opens. The closing of auxiliary switch $b$ causes contacts 17 to be bridged, and there now flows a current from the plus wire through the contacts 17, the coil of the intermediate relay 23, the auxiliary contacts 9 of the main switch and the contacts of the time limit relay 24, to the minus wire. The intermediate relay 23 operates and thereby connects the releasing magnet 8 in parallel to its own coil. The magnet 8 attracts the locking bolt 7 thereby releasing the main switch $a$ which is then brought into circuit interrupting position by spring power, the interruption of the main current taking place in the sequence 3, 2, 1. The main switch in opening first includes one-half of the resistance through the auxiliary switch $b$ and auxiliary bus bar $s_1$ and then all the resistance through auxiliary switch $b$ and auxiliary bus bar $s_2$ in the manner hereinbefore described.

By the rotation of the main switch shaft 4, the contacts 9 and 11 are interrupted simultaneously, and therefore the intermediate relay 23 and the releasing magnet 8 are deënergized, while the auxiliary contacts 10 are bridged. Through the contacts 10, a circuit is closed from the plus conductor through the still bridged auxiliary contacts 17 of the auxiliary switch $b$, the releasing magnet 16 of this switch, the auxiliary contacts 10 and the relay contacts 24 to the negative conductor. The releasing magnet 16 being energized, attracts the locking bolt 15 and the auxiliary switch *b* is thus released and is brought again by spring power into the indicated circuit interrupting position. The electromagnet 13 of the auxiliary switch *b* has already been deënergized, since the hand switch, upon being released, returned automatically into the zero position. The intermediate relay 21 has likewise opened its circuit.

If an overload occurs when the main switch is in circuit, then the overload relay 19 closes its contacts, whereby the coil of the intermediate relay 21 is connected between the plus and minus lines as by the hand switch 18, and connects in circuit the electromagnet 13 of the auxiliary switch. Now the same switching operations take place as in the case formerly described, where the interrupting movement was inaugurated by the hand switch, and it therefore results that when an overload occurs an automatic interruption of the line, machine, or other apparatus, in question occurs; the auxiliary switch *b* being first cut in, then the main switch *a* being opened, and then the auxiliary switch being cut out again.

In order to put in circuit the line, machine, or other desired apparatus, the hand switch 18 is moved to the left, to the "in" position whereupon the coils of the time limit relays 24 and 25, as well as the intermediate relay 21, are energized. By the operation of the intermediate relay 21, the electromagnet 13 is excited and the auxiliary switch *b* is closed and locked in circuit closing position by means of the bolt 15, as has been previously described and the auxiliary contacts 17 are thereby closed. At the same time that the auxiliary switch closes, a circuit is completed from the plus conductor through the extra contact on the hand operated switch in the "in" position, through the time limit relay 25, and contacts of circuit opening relay 24 to the negative conductor. At the same time a parallel circuit is completed through the time limit relay 24, and its contacts, to the negative conductor. Relay 25 closes its contacts and then relay 24 opens its contacts and disconnects its own circuit as well as the circuit of relay 25. Relay 25 thereupon opens its contacts after a predetermined time and relay 24 closes its contacts after a predetermined time. Before relay 25 opens its contacts, however, a circuit is completed from the plus line through the auxiliary contacts 17, the relay coil 22 and the contacts of the time limit relay 25 to the minus line. The intermediate relay 22 is thereby energized and closes a circuit through its contacts including the electromagnet 5 of the main switch *a*. This magnet 5, in being energized, acts through its toothed segment 6 to close the main switch 65 in the sequence 1, 2, 3. When the auxiliary switch *b* is closed, the main switch closes first with all the resistance *w* in series, and then one-half of the resistance is short circuited and finally the whole resistance is short-circuited. By the closing of the main switch the auxiliary contacts 10 are again interrupted, and the auxiliary contacts 9 and 11 closed. About 3 to 4 seconds, after the hand switch 18 has been moved to the left, it returns, after being released, into the zero position. The time limit relay 24, which, in the meantime had opened its contacts and thereby cut out its own coil, as well as that of the time limit relay 25, closes its contacts again. A circuit is thereby closed from the plus conductor through the auxiliary contacts 17, the releasing magnet 16 of the auxiliary switch *b*, the auxiliary contacts 10 of the main switch *a*, and the relay contacts 24, to the minus conductor. The bolt 15 is thus operated by the magnet 16 and auxiliary switch released and cut out of circuit, and the condition represented in the drawing again exists.

My invention may be embodied in other forms than that shown and described, and I therefore do not wish to be restricted to the precise construction shown, but intend to cover by the appended claims all changes and modifications which are within the scope of my invention and are apparent to those skilled in the art.

What I claim as new and desire to secure by Letters Patent of the United States, is,—

1. In a system of distribution, the combination with a bus-bar, of an incoming conductor and an outgoing conductor, a switch for connecting said incoming conductor to said bus-bar, a second switch for connecting said outgoing conductor to said bus-bar, a resistance, and means operatively related to said switches for connecting said resistance between either conductor and said bus-bar when the conductor is being electrically connected to or disconnected from said bus-bar.

2. In a system of distribution, the combination with a bus-bar of an incoming conductor and an outgoing conductor, a switch for connecting said incoming conductor to said bus-bar, a second switch for connecting said outgoing conductor to said bus-bar, a said outgoing conductor to said bus-bar, a resistance, and means for connecting said resistance in circuit with either of said switches during their opening or closing movement.

3. In a system of distribution, the combination with a plurality of conductors, a bus-bar, and an electric switching device comprising main switches for connecting each of said conductors to said bus-bar, a resistance, auxiliary switches operatively related to said main switches, and means including said auxiliary switches for electrically connecting or disconnecting said conductors to said bus-bar first through one of said switches, its operatively related auxiliary switch and said resistance and then directly through said switch.

4. In a system of distribution, the combination with a plurality of conductors, a bus-bar, and an electric switching device comprising main switches for connecting each of said conductors to said bus-bar, a resistance, auxiliary switches operatively related to said main switches and arranged to connect said resistance in series with any of said main switches upon the actuation of said main switch, and means for actuating said auxiliary and coöperating main switches in a definite sequence whereby said auxiliary switches close before their coöperating main switches are actuated and return to normal open position after said main switch is operated.

5. In a system of distribution, the combination with a plurality of conductors, a bus-bar, and an electric switching device comprising main switches for connecting each of said conductors to said bus-bar, a resistance, auxiliary switches operatively related to said main switches and arranged to connect said resistance in series with any of said main switches upon the actuation of said main switch, means for actuating said auxiliary and main switches in a definite sequence, and electro-responsive means for actuating said switches in said definite sequence in response to abnormal conditions upon the conductor.

6. In a system of distribution, an electric switching device comprising a main switch having a plurality of switching contacts arranged to be operated in a definite sequence, a common resistance operatively related to said contacts and adapted to be cut in and out of series with said switch in steps, an auxiliary switch operatively related to said main switch, and means including said auxiliary switch whereby said common resistance is automatically connected in series with said main switch before such switch is opened and cut out of series with said main switch after the switch is closed.

7. In a system of distribution, the combination with a plurality of conductors, a bus-bar, and an electric switching device comprising main switches for connecting each of said conductors to said bus-bar, said switches having a plurality of switching contacts arranged to be operated in a definite sequence, a common resistance, auxiliary switches operatively related to said main switches, and means including said auxiliary switches for automatically connecting said common resistance in series with any of said main switches as said switch is actuated, said resistance being short-circuited by said switching contacts as said main switch opens or closes.

8. In a system of distribution, the combination with a bus-bar, and a plurality of conductors adapted to be connected to said bus-bar, of an electric switching device comprising a main switch for each of said conductors having a plurality of switching contacts arranged to be operated in a definite sequence, a resistance electrically connected to said bus-bar, means for connecting one switching contact of each switch to said resistance, and means electrically connecting a second switching contact to said bus-bar.

9. In a system of distribution, the combination with a bus-bar, and a plurality of conductors adapted to be connected to said bus-bar, of an electric switching device comprising a main switch for each of said conductors having a plurality of switching contacts, a resistance, an auxiliary switch operatively related to each of said main switches, means for electrically connecting one of said switching contacts to one of said conductors through said resistance and said auxiliary switch, and means for electrically connecting in a definite sequence another of said switching contacts directly to said last mentioned conductor.

10. In a system of distribution, the combination with two conductors, of an electric switching device for electrically connecting said conductors comprising a main switch having a plurality of contacts arranged to be closed or opened in a definite sequence, a resistance, an auxiliary switch operatively related to said main switch and arranged to connect said resistance in series with said main switch upon its opening or closing movement, and means for operating the auxiliary and main switches in a definite sequence whereby said auxiliary switch is actuated before said main switch to connect said resistance in circuit with said main switch and after said main switch has operated to successively open or close its plurality of contacts through said resistance said auxiliary switch returns to normal position.

11. In a system of distribution, the combination with a plurality of high tension conductors and a plurality of low tension conductors, of switches for controlling the circuits of each of said conductors, a common resistance for said high tension conductors, a common resistance for such low tension conductors, and means whereby said common resistances are connected in series with any of said low and high tension switches respectively before said switches are opened.

12. In a system of distribution, the combination with a plurality of high tension conductors and a plurality of low tension conductors, switches comprising a plurality of contacts controlling the circuits of each of said conductors, a common resistance for said high tension conductors operatively related to said switching contacts adapted to be cut into and out of circuit in steps, a common resistance for said low tension conductors operatively related to said switch contacts, and means whereby said common resistances are connected in series with said switches connecting said high and low tension conductors respectively before said switches are opened.

In witness whereof I have hereunto set my hand this ninth day of February, 1914.

DR. ING. ERICH PHILIPPI.

Witnesses:
JULIUS RUMLAND,
RICHARD DAVID.